US010118541B2

(12) United States Patent
Condon et al.

(10) Patent No.: US 10,118,541 B2
(45) Date of Patent: Nov. 6, 2018

(54) APPARATUS AND METHOD FOR PHOSPHOR LED BASED SIGNAL LIGHTING

(71) Applicant: Dragonfish Technologies LLC, Richland, MI (US)

(72) Inventors: Patrick Jeffery Condon, Plainwell, MI (US); Mark Bryan Pruss, Delton, MI (US)

(73) Assignee: Dragonfish Technologies LLC, Richland, MI (US)

(*) Notice: Subject to any disclaimer, the term of this patent is extended or adjusted under 35 U.S.C. 154(b) by 451 days.

(21) Appl. No.: 14/532,719

(22) Filed: Nov. 4, 2014

(65) Prior Publication Data

US 2015/0123780 A1 May 7, 2015

Related U.S. Application Data

(60) Provisional application No. 61/899,549, filed on Nov. 4, 2013.

(51) Int. Cl.
*B60Q 1/26* (2006.01)
*F21S 43/20* (2018.01)
(Continued)

(52) U.S. Cl.
CPC ............ *B60Q 1/2696* (2013.01); *F21S 43/14* (2018.01); *F21S 43/255* (2018.01); *F21S 43/26* (2018.01); *F21S 48/215* (2013.01); *F21S 48/2212* (2013.01); *F21S 48/2218* (2013.01); *Y10T 29/49826* (2015.01)

(58) Field of Classification Search
CPC .......... B60Q 1/2696; B60Q 1/28; B60Q 1/30; F21S 48/215; F21S 48/2212; F21S 48/2218; Y10T 29/49826
See application file for complete search history.

(56) References Cited

U.S. PATENT DOCUMENTS 3,831,018 A * 8/1974 Weber .................... B60Q 1/305
362/485
7,572,043 B2    8/2009 Kolstee et al.
(Continued)

FOREIGN PATENT DOCUMENTS

| EP | 1730000 A1 | 12/2006 |
| EP | 2058176 A1 | 5/2009 |
| WO | 2005087542 A1 | 9/2005 |

OTHER PUBLICATIONS

AMECA List of Acceptable Plastics for Optical Lenses and Reflex Reflectors; Oct. 17, 2014—(291 pages).
(Continued)

*Primary Examiner* — James Yang
(74) *Attorney, Agent, or Firm* — Boyle Fredrickson S.C.

(57) ABSTRACT

An illumination device and methods of forming illumination devices having a limited number of white light light emitting diodes (LED's) or solid state lighting (SSL) devices and a color filtering lens or light manipulator disposed over the white light LED to manipulate at least one of a chromaticity, a color temperature value, and a color rendering index (CRI) value of light emitted beyond the illumination device to satisfy regulatory visibly and/or illumination requirements with a more efficiently operable illumination device.

33 Claims, 3 Drawing Sheets

(51) Int. Cl.
*F21S 43/14* (2018.01)
*F21S 8/10* (2006.01)

(56) References Cited

U.S. PATENT DOCUMENTS

| | | | |
|---|---|---|---|
| 7,766,515 B2 | 8/2010 | Condon et al. | |
| 8,104,941 B2 | 1/2012 | Kolstee et al. | |
| 8,192,064 B2 | 6/2012 | Johnson et al. | |
| 2008/0259589 A1* | 10/2008 | Van De Ven | F21K 9/00 362/84 |
| 2010/0103678 A1* | 4/2010 | Van De Ven | F21K 9/00 362/294 |
| 2011/0128729 A1* | 6/2011 | Ng | B63B 45/04 362/231 |
| 2012/0287656 A1* | 11/2012 | Mi | B60Q 1/2665 362/473 |

OTHER PUBLICATIONS

New FMVSS p. 75—on 2011—CFR-2011-title49-vol6-sec571-108; dated Oct. 1, 2011—(183 pages).
ISO-TC188_N1283_TC_188_N1283_N1283_NWIP_LED_navigation_lights_per; ISO 2013—All rights reserved; dated Mar. 4, 2013—(28 pages).
ABYC A-16—Lights Jul. 2011; http://rcd.rulefinder.net/?upaction=document&_sro=true&sid=rfhyfws9xcznrtlgw; dated Aug. 23, 2011—(25 pages).
UN European R48; Uniform provisions concerning the approval of vehicles with regard to the installation of lighting and light-signalling devices; as defined in the Consolidation Resolution on the construction of Vehicles (R.E.3), document ECE/TRANS/WP.29/78/Rev.2, para. 2.—www.unece.org/trans/main/wp29/wp29gen/wp29resolutions.html; dated Jan. 18, 2013—(128 pages).
AMECA Fall 2005 List of Acceptable Plastics Optical Lenses and Reflex Reflectors—(75 pages).

* cited by examiner

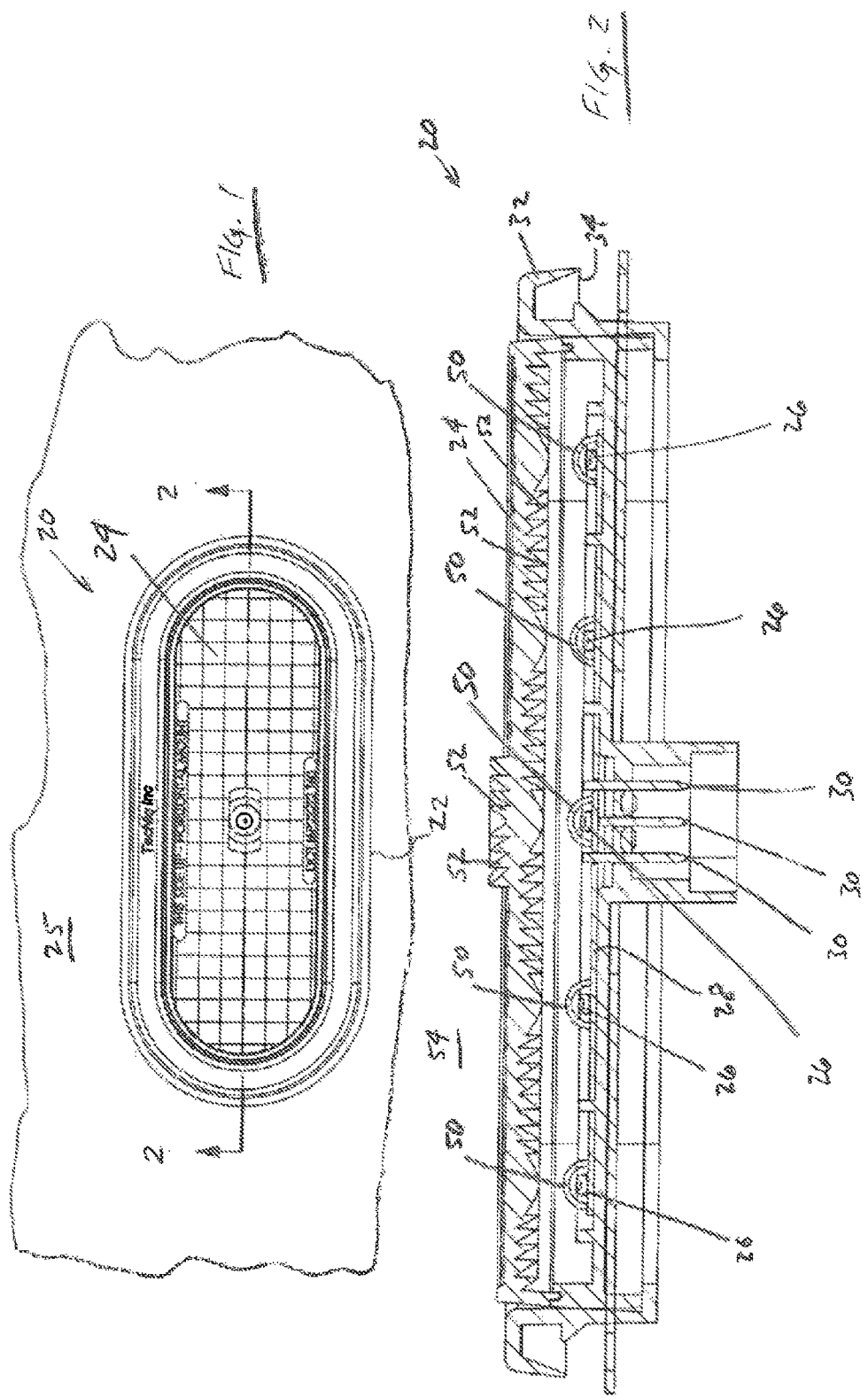

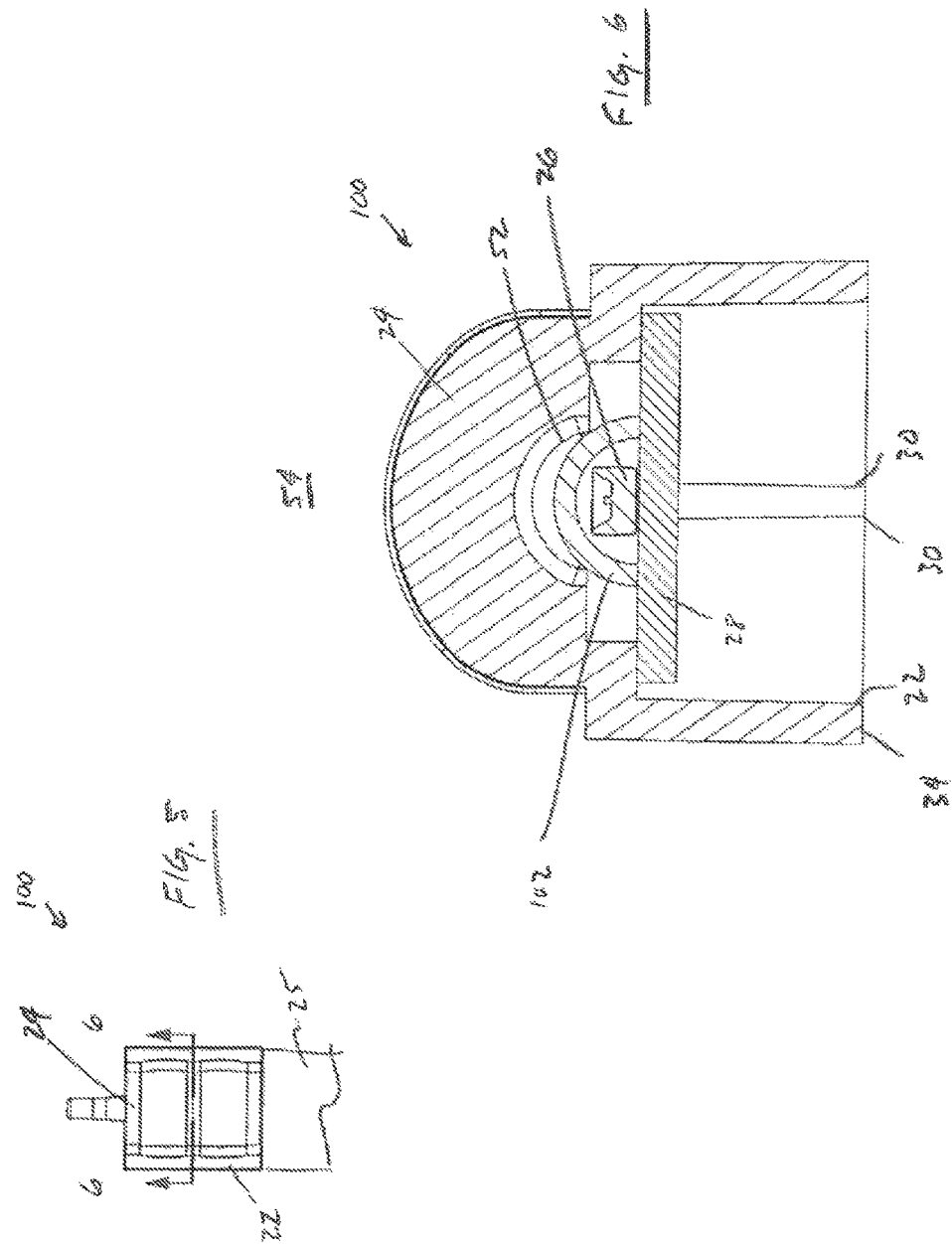

APPARATUS AND METHOD FOR PHOSPHOR LED BASED SIGNAL LIGHTING

CROSS REFERENCE TO RELATED APPLICATION

This application claims priority to U.S. Provisional Patent Application Ser. No. 61/899,549 titled. "An Apparatus And Method For Phosphor LED Based Signal Lighting", filed on Nov. 4, 2013, and the entirety of which is expressly incorporated herein.

FIELD OF THE INVENTION

The present invention relates generally to the redistribution of radiant energy, particularly electromagnetic energy to achieve efficient and low cost products. More particularly, the present invention relates to apparatus and methods for generating legally mandated spectrums of light energy from white light-emitting diodes (LED's) to satisfy visibility and illumination requirements in exterior automotive, marine, aviation, etc. vehicle applications.

BACKGROUND OF THE INVENTION

Historically, the automotive industry has used colored plastic lenses over white light generating bulbs to produce an output light signal having a desired chromaticity or objective specification of the quality of a color regardless of its luminance so as to maximize visibility and illumination characteristics without unduly interfering with the function of the eye of the viewer. The performance of plastics associated with such light devices is governed by regulations promulgated by various agencies such as the U.S. Department of Transportation Federal Motor Vehicle Safety Standard (FMVSS) 108, the UN European standard, etc. The entirety of which are expressly incorporated herein. The result of such regulations has been the availability of only limited materials for automotive lighting lens applications. Developing of and seeking approval for new lens materials is commonly a costly and time intensive process.

One such body that has been delegated responsibility associated with maintaining desired vehicle marker lighting visibility is the Automotive Manufacturers Equipment Compliance Agency, Inc. (AMECA) of Washington D.C. AMECA periodically publishes a listing of "Acceptable Plastics for Optical Lenses and Reflex Reflectors Used on Motor Vehicles." The fall 2005 and October 2014 Final Edition of the "Acceptable Plastics for Optical Lenses and Reflex Reflectors Used on Motor Vehicles" AMECA publication is expressing incorporated herein as disclosing various acceptable materials for use as motor vehicle optical lenses and reflex reflectors. Still other bodies, such as the American Boat and Yacht Council, Inc. (ABYC) and the American National Standards Institute (ANSI) have developed various equipment division standards, such as the Equipment Division Standard Navigation Lights and Sound Signal Appliances Project Technical. Committees, (ABYC A16, July 2011) associated with designating suitable standards for Electrical Navigation Lights as well as the Jun. 3, 2013 International Organization for Standards (ISO) New Work Proposals for Performance and Testing of LED Navigation Lights which promulgate international requirements for marine navigation light performance. The disclosures of each of which are expressly incorporated herein.

Further limiting industry choices, incandescent bulbs used in developing red, yellow, green and blue lighting with the correct filtering have functionally similar output spectra which follow very closely to the Planck blackbody emission spectrum which associates a radiation spectrum, intensity, and temperature of the respective body. The result of these two situations is an extremely limited choice of available lighting and filtering materials that can satisfy the regulatory performance requirements to provide the desired spectral characteristics. For instance, when designing a lighting fixture to satisfy automotive requirements, specifying a certified plastic having the automotive red or amber color from different manufacturers can result in nearly imperceptible difference in color performance between the lenses when placed over the same light sources, thereby rendering any choice between different manufacturers or different automotive certified lens plastics nearly irrelevant to the color performance of a given lamp.

In recent years, solid state illumination devices such as light emitting diodes (LED's) have gained popularity in use in various applications including the automotive markets, due in no small part to the efficiency with which such devices generate light from electrical energy. Although efficient at generating light from an electrical signal, such devices commonly generate light energy having characteristics that are ill-suited for many applications, absent some manipulation of the light signal, and still other applications suffer from drawbacks associated with the integration, of the illumination device into the operating systems associated with an underlying device.

For instance, amber aluminium indium gallium phosphide (AlInGaP) LED technologies in automotive lighting applications have problems related to the generation of heat during operation. Such LED's have the advantage of directly generating light output of a narrow spectral range in only the color needed. Standard colored plastics from the automotive industry transmit well in the wavelength range of these LED's and therefore do not or only negligibly affect the spectral output of the devices. However, the generation of heat in the die during operation of such LED's causes color shifting of the output which creates problems in meeting government standards for color and visibility, such as the UN defined European and U.S. vehicle safety specifications. Another significant concern, particularly for amber LED's, is a substantial intensity drop that occurs during operation of the device. Amber die LED technology exhibits up to a 50% loss of output as the temperature of the device transitions from start-up to steady state conditions. Such a deviation results in a color shift in AlInGaP LED devices which are bright yellow upon startup but quickly shift to a dimmer redder light. The AlInGaP LED color and brightness problems have prevented production of otherwise cost effective solutions since the beginning of the automotive LED lighting technology.

Indium gallium nitride (InGaN) type LED's have only more recently been developed and commonly use phosphor materials to create a wide spectrum white light output. The vehicle signal lighting potential of this technology has yet to garner appreciable interest from LED manufacturers for the direct production of vehicle approved phosphor red, green, blue or amber light derived from the high energy blue/blue green or UV light generated by InGaN type LED's. The difficulties in amber AlInGaP LED performance have resulted in a number of phosphor based amber solutions. Commonly, InGaN die and phosphor combinations are manufactured to convert short wavelength blue or ultraviolet light into the other components of the desired spectrum as phosphors placed near the die absorb the shorter, higher energy, wavelengths and generally re-emit at longer wavelengths. Through chemistry, the output can typically be fine-tuned to white light having a more complete spectrum or it can be tuned to other colors such as amber. Such customized developments substantially increase the cost associated with the production of each discrete light however basic, characteristics of the InGaN die-phosphor combination can produce a dramatically reduced color shift during warm-up with minimal intensity loss or droop during warm-up.

In an attempt to resolve the most severe color and brightness shortcomings of LED based amber light sources, some LED manufacturers have begun producing InGaN LED lights that provide a yellow output to satisfy the color coordinates associated with vehicle lighting industry requirements. The table below includes various color coordinate values associated with the generation of desired light colors. Although there has been some acceptance of such technologies in limited industries, the relatively low cost of AlInGaP LED technology has traditionally outweighed the cost and complexity associated with implementation of the phosphor based lighting and color solutions in many applications and with the ability to achieve an illumination parameter at prescribed color coordinates.

| Signal light colour | | Coordinates of the vertices | | | | | |
|---|---|---|---|---|---|---|---|
| White | X | 0.310 | 0.443 | 0.500 | 0.500 | 0.453 | 0.310 |
|  | y | 0.283 | 0.382 | 0.382 | 0.440 | 0.440 | 0.348 |
| Red | X | 0.690 | 0.710 | 0.680 | 0.660 | | |
|  | y | 0.290 | 0.290 | 0.320 | 0.320 | | |
| Green | X | 0.009 | 0.284 | 0.207 | 0.013 | | |
|  | y | 0.720 | 0.520 | 0.397 | 0.494 | | |
| Yellow | X | 0.612 | 0.618 | 0.575 | 0.575 | | |
|  | y | 0.382 | 0.382 | 0.425 | 0.406 | | |
| Blue | X | 0.136 | 0.218 | 0.185 | 0.102 | | |
|  | y | 0.040 | 0.142 | 0.175 | 0.105 | | |

Unlike current automotive LED technology, white LED's have high competition in markets like interior lighting, video screen backlighting, and commercial lighting. Television manufacturing companies have also begun producing LED devices rather than rely on outside suppliers and have begun offering their devices for sale commercially. Price and performance pressures have mounted across the industry as many large manufacturers have entered the field. Unfortunately, such white light LED technologies are ill-suited for use in many known vehicle lighting systems.

As alluded to above, when designing for automotive lighting requirements, specification of a certified plastic materials having a desired automotive red or amber color from different manufacturers results in very similar color performance when placed over an incandescent or halogen light source such that choice of manufacturer or different automotive certified plastic supplier is nearly irrelevant as to the underlying performance of the resultant lamp. In addition, efficiency pressures in the industry demand that today's white light LED's produce a white light output which does not exactly follow Planck's blackbody spectral curve and typically produces very little long-wavelength red light. High performance white light LED's are rated in Lumens; an eye response weighted measure of light output. One Lumen of green is equally as bright as one Lumen of blue, but the human eye does not respond to blue as strongly as green such that the one Lumen of blue will actually have more radiance (watts) than the one Lumen of green. Also important to visual inspection of such lighting devices is attention to characteristics related to the physical response of the human eye to the light, such as the ability of the human eye to be stimulated to perceive white with as few as two monochromatic wavelengths although three monochromatic wavelengths are commonly used in other industries such as the television industry.

Typically, manufacturers of LED illumination devices, in an effort to maximize performance of the LED device, tailor their products to maximize the generation of light within the spectrum where the human eye is most efficient. Unfortunately, and detrimentally for vehicle applications, the human eye is less efficient at perceiving the deep red light spectrum, such that white light LED manufacturers tailor their products to limit the production of the longer wavelengths of red light to favor the higher performance yet perceivably white light LED's.

The color rendering index (CRI) is another consideration that must be assessed when LED's are utilized for illumination. The CRI of an LED is a typical measure of color quality. A value of 100 represents a perfect color match to the blackbody curve. Incandescent lamps have a CRI value that approaches 100 such that they generate outputs that very nearly match the blackbody curve but fluorescent lamps typically have a CRI of about 50. In order to achieve a high CRI, in practice, all colors must be produced to some extent by a respective lighting device. Unfortunately, many of the high CRI LED devices still do not produce sufficient red to produce light of a chromaticity within the automotive color requirements using commercially available and acceptable automotive lens plastics. The result of these paradigms is an inability of prior art assemblies to utilize white LED's to produce an amber or red light that satisfies the regulated lighting requirements and utilizes any of the commercially available filtered yellow and/or red lenses. Accordingly, there is a need for a white light based LED vehicle fixture which can satisfy externally dictated structure and illumination requirements.

Therefore, it is desirable to produce an LED based vehicle light having reduced warm-up induced color shift and intensity loss, that can be manufactured in a cost-effective manner, can produce a brighter light than other known lighting devices that satisfy the regulatory requirements, and can be provided in a relatively compact form factor and have sufficient intensity and color characteristics to meet one or both of American and/or European vehicle industry lighting or illumination color and output specifications. As used herein, it is appreciated that the vehicle industry includes various methods of conveyance or transportation such that use of the terms "vehicle" or "vehicle industry" includes various different types of vehicles that operate in different environments and includes automotive, marine, emergency, recreation, aviation vehicles, etc. It is appreciated that such terms connote an intended use of the vehicle, an operating environment, and other features that may be specific or common between the respective vehicle types. The present invention is applicable to various "vehicle" configurations.

SUMMARY OF THE INVENTION

The present application discloses a solid state white light illumination device that overcomes one or more of the shortcomings disclosed above. One aspect of the application discloses an illumination device and methods of forming illumination devices having a limited number of white light LED's and a lens disposed over the white light LED to manipulate at least one of a chromaticity, a color temperature value, and a color rendering index value associated with light emitted beyond the illumination device to satisfy regulatory visibly and/or illumination requirements with a more efficiently operable illumination device.

Another aspect of the application discloses an illumination device for vehicles that includes a body and at least one white light emitting diode (LED) supported by a circuit board that is, supported by the body. A pair of conductors are electrically connected to the white LED and extend beyond the body for connecting the illumination device to the power system of a vehicle such that the at least one white LED and circuit board are sealed within the body and such that the white LED is directed toward a lens secured to or integrated with the body. The lens is attached or integrated with the body and disposed generally over the white LED and filters light emitted by the white LED so that the illumination device emits light of a different chromaticity than the chromaticity of light emitted by the white LED.

Another aspect of the application discloses an illumination device for vehicles that includes a body and at least one white light emitting diode (LED) supported by a circuit board that is supported by the body. A pair of conductors are electrically connected to the white LED and extend beyond the body for connecting the illumination device to the power system of a vehicle such that the at least one white LED and circuit board are sealed within the body and such that the white LED is directed toward a clear colorless lens secured to or integrated with the body. Preferably, a small colored filter formed of plastic or other material is placed between the white LED and the external clear lens and filters light emitted by the white LED so that the illumination device emits light of a different chromaticity than the chromaticity of light emitted by the white LED Another aspect of the application discloses a method of producing a vehicle light that includes supporting a white LED that has a color temperature that is less than 3500K, less than 2700K, and preferably approximately 2400K, and a color rendering index that is greater than 75 within a fixture body. A lens is disposed over the fixture body in proximity to the white LED so that light emitted from the vehicle light has a color temperature value and a color rendering index value that is different than the color temperature and the color rendering index of light emitted by the white LED to satisfy a vehicle marker standard that is not satisfied by light emitted directly from the white LED.

Another aspect of the application discloses a method of forming an external vehicle light. A white solid state light emitting device having a color rendering index value that is at least 75 is sealed within a housing and proximate a lens that manipulates the color rendering index value of light emitted from the solid state light emitting device so that light emitted from the external vehicle light has chromaticity coordinates that satisfy a regulatory requirement and that are different than chromaticity coordinates of light emitted by the white solid state light emitting device.

These and other aspects and advantages of the application will be better appreciated and understood when considered in conjunction with the following description and the accompanying drawings. It should be understood, however, that the following description, while indicating representative embodiments of the present invention, is given by way of illustration and not of limitation. Many changes and modifications may be made within the scope of the present invention without departing from the spirit thereof, and the invention includes all such modifications.

In describing the representative embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

BRIEF DESCRIPTION OF THE DRAWINGS

Various exemplary embodiments of the subject matter disclosed herein are illustrated in the accompanying drawings in which like reference numerals represent like parts throughout, and in which:

FIG. 1 is a top plan view of a vehicle lighting device according to one embodiment of the invention;

FIG. 2 is a cross-section view of the vehicle lighting device shown in FIG. 1 taken along line 2-2;

FIG. 5 is a view similar to FIG. 3 of another vehicle lighting device according to another embodiment of the invention; and FIG. 6 is a cross-section view of the vehicle lighting device shown in FIG. 5 taken along line 6-6.

Figure 3:
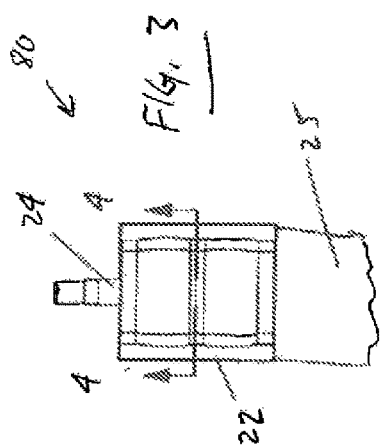
FIG. 3 is a view similar to FIG. 1 of another vehicle lighting device according to another embodiment of the invention.

In describing the representative embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

Figure 4:
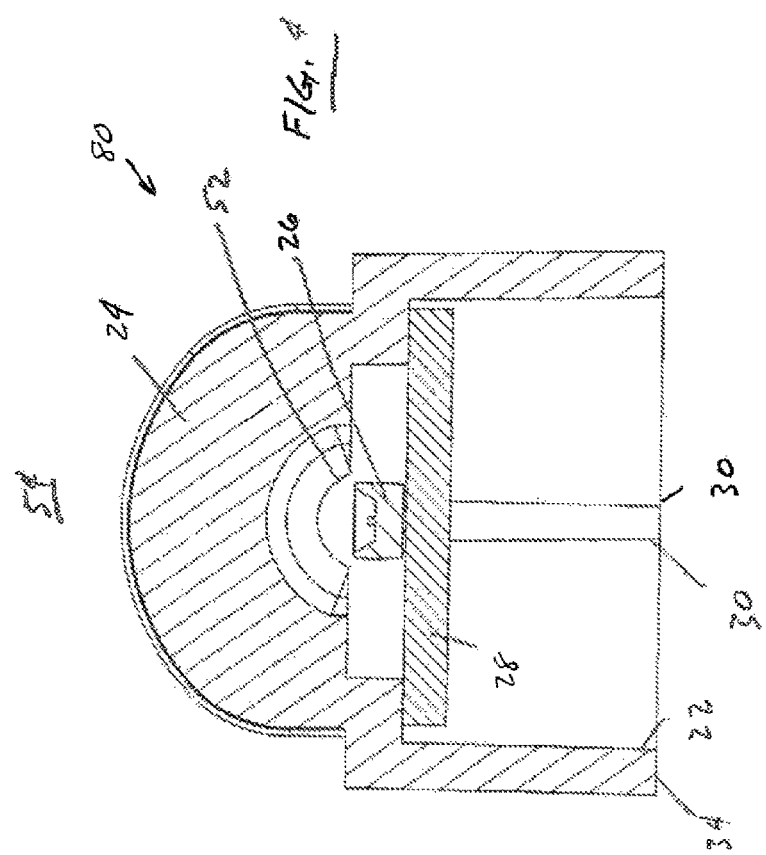
FIG. 4 is cross-section view of the vehicle lighting device shown in FIG. 3 taken along line 4-4.

FIGS. 1 and 2 show a vehicle illumination device 20 according to one embodiment of the invention, FIGS. 3 and 4 show a vehicle illumination device 80 according to another embodiment of the invention, and FIGS. 5 and 6 shown a vehicle illumination device 100, similar in shape to illuminating device 80, and which includes a filter 102 associated with generating the desired illumination performance associated with operation of illumination device 100. For clarity, like reference numerals will be used throughout the present application to refer to similar structures with respect to the respective illumination devices 20, 80, 100. Each illumination device 20, 80, 100 includes a fixture, housing, or body 22, a lens 24 that is disposed thereover, and at least one white light solid state light (SSL) generating device or white light light emitting diode (LED) or white light or simply white LED 26 that is generally disposed in a preferably sealed manner within the respective illumination device 20, 80, 100. Although shown as being provided in configurations that include five white light LED's, as shown in illumination device 20, and configurations that include one white light LED, as shown in illumination devices 80, 100, it is appreciated that illumination devices 20, 80, 100 can be provided with virtually any number of white light LED's.

Preferably, each illumination device 20, 80, 100 or a portion of body 22, includes a bezel 32 of similar such structure that defines a lip 34 that is shaped to overlap a portion of the respective vehicle or support structures, such as a stem of a pole light, thereby providing a finished aesthetic appearance to the interface between each respective illumination device 20, 80, 100 and the underlying vehicle and/or support structures. It is envisioned that the illumination devices 20, 80, 100 can snap-fittingly cooperate with the underlying vehicle or be configured to be secured thereto via utilization of extraneous fasteners, threaded connections, or bonded or otherwise adhered to supplemental housing like structures.

In one aspect, illumination devices 20, 80, 100 are constructed to be supported by a vehicle 25. It is appreciated that the lighting or illumination devices disclosed herein are usable in various vehicle configurations such as cars, trucks, all terrain vehicles, all terrain utility vehicles, watercraft or marine vessels, as well as aircraft to provide but a few of the intended applications suitable for use of the illumination devices disclosed herein. It is appreciated that vehicle 25 can be provided in virtually any form factor such as recreational vehicles like all terrain vehicles (ATV's), utility terrain or task vehicles (UTV's), golf carts, recreational off highway vehicles (ROV's), marine craft or vessels, aircraft, road or highway road vehicles, construction and agricultural equipment, etc., to name but a few. It if further appreciated that vehicle 25 may be formed as a trailer or similar device associated with transporting goods or even another vehicle which may also include one or more of illumination devices 20, 80.

It is further appreciated that vehicle 25 can be powered electrically, via an internal combustion engine, combinations thereof, or powered by a tow vehicle when provided in such a modality. It is further appreciated that in some applications, illumination devices 20, 80, 100 can preferably be provided in a configuration wherein the respective illumination device is supported or otherwise constructed to removably cooperate with the underlying vehicle. For instance, in some watercraft applications, running lights are provided which removably cooperate with the underlying vehicle to facilitate stowage of the lights during daylight hours and/or to provide elevated positioning of the illumination devices during usage, such as being provided as a pole light or the like. When provided in such, a configuration, the respective illumination devices 20, 80, 100 preferably cooperate with the underlying vehicle, or a stem associated with defining a pole light, in a plug-and-play manner so as to provide a tool-less connectivity of the respective illumination device relative to the underlying vehicle and the corresponding electrical system thereof. It is further appreciated that the respective underlying vehicle can include one or more switches or sensors associated to allowing selective operation of the illumination devices 20, 80, 100. It is further appreciated that many vehicles commonly have more than one illumination device for facilitating illumination of the vehicle or surrounding area in multiple directions, such a bow and stem pole lights when provided in a marine light configuration.

Regardless of any specific construction or utility associated with a respective underlying vehicle 25 or the cooperation of the respective illumination devices 20, 80, 100 with the underlying vehicle 25, each illumination device 20, 80, 100 preferably includes at least one white LED 26 that is preferably supported by a circuit board 28 and which is electrically connected to one or more leads or conductors 30 that are exposed to atmosphere or otherwise extend beyond the confines of the respective body 22 for connecting the respective illumination device 20, 80, 100 to an underlying vehicle 25, or the intermediary support structure associated therewith, to which the illumination device is associated. Preferably, a portion of body 22 associated with conductors 30 is shaped in a plug-and-play or snap-fit connection methodology to facilitate efficient, secure, and preferably sealed and/or removable connectivity of each respective illumination device 20, 80 and the underlying electronic system of a respective vehicle.

Preferably, each LED 26 of illumination devices 20, 80, 100 are white light LED's that generate a light at a color rending index (CRI) value of greater than 70. More preferably, the CRI value of each white LED 26 is at least 80, and more preferably nearer or about 90. It should be appreciated that values between 80 and 100 are considered to be within a suitable range of about 90 with respect to the present invention. Preferably, according to one aspect of the present invention, lens 24 defines a modifier or manipulator that manipulates the light emitted from white LED's 26 prior to the light being emitted to atmosphere or beyond the boundary of the respective illumination device 20, 80. In one aspect, lens 24 is defined as a filtering plastic and more preferably as a filtering plastic that has been previously certified to satisfy the requirements of Federal Motor Vehicle Safety Standard 108 (FMVSS 108), which, along with the comparable parameters of the UN R48 (European Standard), is expressly incorporated herein, to meet all of the color and visibility requirements for a respective market including automotive lighting and sidelight marker lighting markets. An interior surface 52 of lens 24 can have a more aggressive reflective and/or refractive construction, as shown in FIG. 2, or a less aggressive reflective/refractive construction as shown in FIGS. 4 and 6.

Preferably, each white LED 26 also operates at a light output range having a color temperature of under about 3500K and a CRI of between about 75 to about 100. It should be appreciated that such LED's produce substantially more red light than white light LED's having higher color temperature values. Empirical studies conducted during development of the present invention has shown that LED's 26 that preferably produce light have a color temperature value between about 2400K and about 3000K for use with authorized lens materials satisfy the requirements of FMVSS 108. White LED's 26 having a color temperature value of approximately 2700K and a CRI between approximately 85-95 or higher have been found to meet the edge of the automotive, marine and aviation color requirements using standard, i.e. previously approved, plastic materials. More preferably, LED's 26 operate at a color temperature value of approximately 3000K, 2900K, or about 2700K and have a color rending index (CRI) value of approximately 95. Warmer color temperature generating devices such as 2400K or about 2000K color temperatures have also been shown to meet the center of the color specification when using an LED having a lower CRI value of approximately 85. As used herein, terms like "about" and "approximately" with respect to the color temperature and color rending index (CRI) includes values that deviate 0-10% from the stated values.

The white light LED's 26 have been shown, in the present invention, to meet the applicable standards identified above with use of approved lens materials, and do so at appreciable cost and performance incentives. For instance, it has been determined that white LED's of InGaN technology have output energy that is approximately 10 times greater than a similarly priced AlInGaP device. Although a filtered plastic lens 24 absorbs more than a negligible amount of the energy output from a white LED, the remaining transmitted light is still greater than the light output associated with a comparable assembly equipped with an AlInGaP technology LED. In the case of an amber (yellow) sidemarker/clearance lamp, outputs 10 times greater can be achieved at the same discrepancy in price and performance between InGaN technology white LED technology and AlInGaP red and/or yellow LED technology.

In LED lighting for truck, trailer and marine markets, the output of the LED's drives much of the product cost. That is, as disclosed above, it is appreciated that illumination devices 20, 80, 100 can be provided in various form factors that form marine navigation lights, vehicle side marker lamps, including aircraft, emergency vehicle and marine applications, and amber and red illumination devices. It is further appreciated that the present invention is particularly well suited to provide relatively small illumination devices, such as illumination devices 80, 100 as compared to illumination device 20, and/or such as illumination devices provided in, a form factor similar to those discussed in the background of the present application, or other applications where warm-up is an important consideration of lighting device design construction and operation. It is further appreciated that the present invention is usable to generate red colored markers, even though the regulations discussed herein have a lower red requirement and the regulatory specification is easier to satisfy, as well as amber tail lamps constructed in accordance with illumination devices 20, 80, 100 generate considerably more light than prior art lighting devices.

Price pressures in the industry from vigorous competition have driven manufacturers to produce to the minimum specification in illumination, and thereby price, especially in yellow LED's. Whereas incandescent bulb designs of decades ago had outputs limited more by heat than by cost, the current paradigm allows cost to override optimized performance in favor of tolerable performance at lower prices. However, illumination devices 20, 80, 100 of the present invention surpass the performance of prior colored LED illumination devices in a manner that utilizes more economically conducive white light LED's when paired with suitably configured filters or lens to generate lighting device visibility and illumination parameter outputs that satisfy the desired regulatory requirements.

In the preferred embodiment, an LED having a color temperature of 2700K and a color rendering index of 90 or greater combined with standard, red, yellow, blue and green materials produces a filtered or manipulated light output that satisfies the European and United States of America color standards and does so with a solution having a brightness that is greater than the brightness associated with utilization of an unfiltered LED that produces light only in the desired spectrum. Illumination devices 20, 80, 100 also provide lighting devices with greater color-stability during manufacture and operation in large volume manufacturing environments.

It is appreciated that lens 24, whether provided to cooperate with illumination devices 20, 80, or 100 can be configured to manipulate the illumination performance associated with illumination devices 20, 80, 100. The thickness of lens 24 is considered in the design of illumination devices 20, 80, 100 to maintain the desired performance thereof. That is, lens 24 is thick enough to accommodate efficient manufacture of the lens but not so thick as to generate excess light attenuation. For those applications where thicker or clear lenses are required for design or operational requirements, a light manipulator in the form of a thin layer of optional filtering plastic 50 (FIG. 2), 102 (FIG. 6) may be incorporated into the design of any or illumination devices 20, 80, 100 separately from a clear lens 24. It is appreciated that filters 50, 102 may be considered a first or inner lens and lens 24 may be considered a second or outer lens when a respective illumination device 20, 80, 100 is provided in a configuration that include a first manipulation and a second manipulation of the light emitted by LED's 26 before the light is emitted to atmosphere 54. Although shown as being formed in close proximity to respective white LED's 26, it is appreciated that optional filter 50, 102 could be constructed to manipulate the light output by multiple white LED's 26 prior to passage of the light to a corresponding lens 24. Optional filter 50, 102 is preferably disposed between white LED(s) 26 and lens 24 whereas lens 24 is disposed between white LED's 26 and an atmosphere 54 to which the light is introduced during operation of the respective illumination device 20, 80, 100. As such, it should be understood that any of illumination devices 20, 80, 100 can be provided with one or more manipulators or filters in the form of lens 24 and/or optional filters 50, 102.

The respective manipulator 24, 50, 102 manipulates the chromaticity coordinates associated with operation of the respective white LED's 26 prior to the light exiting the respective illumination device 20, 80, 100. Said in another way, light emitted from white LED's 26 has a first chromaticity whereas light emitted from illumination devices 20, 80, 100 to atmosphere, via passage of the light emitted from the respective white LED's 26 through one or both of a respective lens 24 or an optional filter 50, 102 has a second chromaticity or a color quality that is independent of the brightness of the respective illumination device 20, 80, 100. Such an understanding increases the usable environments and applications suitable for uses of illumination devices 20, 80, 102. Applicant's U.S. Pat. No. 7,766,515 discloses other considerations pertinent to the construction of lens 24 of illumination devices 20, 80, 100 for different purposes. The disclosure of U.S. Pat. No. 7,766,515 is expressly incorporated herein.

Preferably, illumination devices 20, 80, 100 according to the present invention, although usable in a number of environments including portable lamps and specialty lighting, over-land vehicles, watercraft, aircraft and manned spacecraft, automobiles, trucks, boats, ships, buses, vans, recreational vehicles such as acv's and utv's, bicycles, motorcycles, mopeds, motorized cars, electric cars, airplanes, helicopters, space stations, shuttlecraft and the like; camping lanterns, head or helmet mounted lamps as used in mining or spelunking, hand-held flashlights and the like; advertising-use lamps (such as search lamps), street lighting, traffic lights, railroad signals, emergency lighting activated during power failures and information displays, are defined by a body or housing that is shaped to cooperate with a lens and preferably sealingly contain at least one white light LED having a color temperature of less than approximately 3500K, preferably 2900K for some applications, and a color rendering index that is greater than 75 and which cooperate with a lens and/or filter having sufficient thickness and design such that light output by the respective illumination device satisfies the predefined vehicle illumination output requirements. It is appreciated that the applications and vehicle types expressly disclosed herein cannot be all inclusive of applications and uses of an illumination device constructed in accordance with the present disclosure and that the present invention has applicability beyond the express recitations above.

The present invention may be implemented in a variety of configurations, using certain features or aspects of the several embodiments described herein and others known in the art. Thus, although the invention has been herein shown and described in what is perceived to be the most practical and preferred embodiments, it is to be understood that the invention is not intended to be limited to the specific features and embodiments set forth above. Rather, it is recognized that modifications may be made by one of skill in the art of the invention without departing from the spirit or intent of the invention and, therefore, the invention is to be taken as including all reasonable equivalents to the subject matter disclosed herein.

What we claim is:

1. An illumination device for a vehicle, the illumination device comprising:
    at least one white light source consisting of a number of white light emitting diode (LEC(s)) having a color temperature that is not greater than 2950K and that is supported by a circuit board that is supported by a body;
    at least one of a lens and a filter disposed between the at least one white light source and atmosphere, the at least one lens or filter formed of a material identified in the AMECA "Acceptable Plastics for Optical Lenses and Reflex Reflectors Used on Motor Vehicles" as being suitable of vehicle optical lenses and reflex reflectors and configured to manipulate a chromaticity of light emitted by the white light source so that light emitted to the atmosphere via the at least one of the lens and filter has a different chromaticity than light emitted by the white light source and satisfies visibility requirements of at least one of United States Federal Motor Vehicle Safety Standard 108 (FMVSS 108), European Standard regulation UNECE R48, the ABYC A16 standard, and the ISO proposed Performance and Testing of LED Navigation Lights; and
    a pair of conductors electrically connected to the at least one white light source and extending beyond the the body, the pair of conductors being configured to electrically connect the illumination device to a power system of a vehicle such that the at least one white light source and the at least one lens and filter, and circuit board are sealed within the body such that the white LED is directed toward the at least one of the lens and filter and is secured to or integrated with the body and wherein both the at least one lens and the filter are formed of AMECA approved materials.

2. The illumination device of claim I wherein the different chromaticity is determined from a standard derived from an intended application of the illumination device.

3. The illumination device of claim 1 wherein each white light LED is further defined as an InGaN type LED.

4. The illumination device of claim 1 wherein the vehicle is further defined as one of a car, a truck, a trailer, an atv, a utv, an aircraft, or a watercraft.

5. The illumination device of claim 1 wherein the illumination device emits light that satisfies at least one of a color corner coordinate requirement defined in a respective one of the United States Federal Motor Vehicle Safety Standard 108 (FMVSS 108) November, 2013 and European Standard regulation UNECE R48 November, 2013.

6. The illumination device of claim 1 wherein the lens is formed of one of Bayer PC 2805 Green or Bayer PC 2805 Red as listed in the AMECA "Acceptable Plastics for Optical Lenses and Reflex Reflectors Used on Motor Vehicles".

7. The illumination device of claim I wherein the White light LED has a color temperature value of no greater than 2900K and a color rending index (CRI) value of at least 75.

8. The illumination device of claim 7 wherein the white light LED has a color temperature value of no greater than 2700K.

9. The illumination device of claim 8 wherein the white light LED has a color temperature value above 2400K and a CRI of at least 80.

10. The illumination device of claim 7 wherein the white light LED has a CRI of at least 90.

11. The illumination device of claim 1 wherein the material is selected so that the illumination device provides either of an amber output or a red output when the at least one white light source is illuminated.

12. The illumination device of claim 1 further comprising a circuit board that supports the at least one white light source and a body that supports the circuit board such that the body and the at least one of a lens and a filter are disposed on opposite sides of the at least one white light source.

13. The illumination device of claim 12 wherein the at least one of a lens and a filter is further defined as a lens that at least one of snap-fittingly cooperates with the body, sealingly cooperates with the body, and is integrally formed with the body.

14. The illumination device of claim 1 wherein the at least one of a lens and a filter is further defined as a filter disposed between the at least one white light source and a clear lens.

15. The illumination device of claim 14 wherein the clear lens at least one of snap-fittingly cooperates with a body, sealingly engages a body, and is integrally formed with a body, or wherein the body is constructed to support the at least one white light LED.

16. A method of producing a vehicle light, the method comprising:
    supporting a white light source that consists of at least one a white light light emitting diode (LED) and that has a color temperature that is no greater than 2950K and a color rendering index that is greater than 75 with on a circuit board supported by a fixture body; and
    disposing a manipulator that is formed of an AMECA approved material for generating an illumination output over the white light source so that light emitted from the vehicle light has a color temperature value and a color rendering index value that are different than a color temperature and a color rendering index of light emitted by the white light LED and satisfy a vehicle marker visibility standard that is not satisfied by light emitted from the white light source; and
    extending a pair of conductors that are configured to electrically connect to the white light source through the body such that the pair of conductors are configured to electrically connect the illumination device to a power system of a vehicle such that the at least one white light source, the manipulator, and circuit board are sealed within the body such that an output of the white light source is directed toward the manipulator that is formed of the AMECA approved material.

17. The method of claim 16 further comprising forming the manipulator by at least one of a filter spaced from the white light source and disposed between the white light source and a lens and a lens spaced from the white light source and disposed between the white light source and atmosphere.

18. The method of claim 16 wherein the color temperature of the white light LED is between 2950K and 2000K.

19. The method of claim 16 wherein the color rendering index value of the white light LED is between 99 and 75.

20. The method of claim 16 wherein the vehicle marker visibility standard is further defined as a government standard.

21. The method of claim 20 Wherein the government standard is further defined as one of an American standard and a European standard.

22. The method of claim 21 the white light source further comprises supporting a plurality of white light LED's with the fixture body to satisfy a vehicle marker standard that requires greater illumination and different color corner coordinates than provided by the plurality of white light LED's.

23. A method of forming a vehicle indicator light, the method comprising:
disposing a white light emitting solid state lighting (SSL) device having a color rendering index (CRI) value that is at least 75 and a color temperature that is no greater than 2950K proximate a manipulator that is formed of an AMECA approved material and that filters the spectrum of light emitted from the white light SSL device so that light emitted to atmosphere from the vehicle indicator light and attributable only to energization of the white light emitting solid state lighting (SSL) device has chromaticity coordinates that satisfy a regulatory requirement and are different than chromaticity coordinates of light emitted by the white light SSL device prior to passage of the light through the manipulator; and
supporting the white light emitting SSL device a circuit board that is supported by a body;
electrically connecting a pair of conductors to the white light emitting SSL and extending the conductors beyond the body such that the pair of conductors are configured to electrically connect the vehicle indicator light to a power system of a vehicle such that the white light emitting SSL, the manipulator, and the circuit board are sealed within the body such that the white light emitting SSL is directed toward the manipulator that is formed of the AMECA approved material.

24. The method of claim 23 further comprising providing the manipulator as one of a lens that is exposed to atmosphere and a filter that is disposed between a clear lens and the white light SSL device.

25. The method of claim 23 further comprising attaching the body to one of a marine craft, an automotive vehicle, an on-road vehicle, an off-road vehicle, or an aircraft.

26. The method of claim 25 further comprising supporting the white light SSL device on the circuit board and supporting the circuit board and the white light SSL device in a sealed manner between the body and a lens.

27. The method of claim 26 further comprising shaping the body to snap-fittingly cooperate with a connector associated with a respective vehicle.

28. The method of claim 23 wherein the color rendering index is further defined as at least 90.

29. The method of claim 23 further comprising forming the manipulator as a lens from a material listed in the AMECA October 2014 Final Edition of "Acceptable Plastics for Optical Lenses and Reflex Reflectors Used on Motor Vehicles" and the regulatory requirement is further defined as one of United States Federal Motor Vehicle Safety Standard 108 (FMVSS 108), European Standard regulation UNECE R48, the ABYC A16 standard, and the ISO proposed Performance and Testing of LED Navigation Lights such that the vehicle indicator light can generate a standard acceptable red output or a standard acceptable amber output from light emitted from the same white light SSL device and different manipulators that are each formed of AMECA approved materials.

30. An illumination device for vehicles, the illumination device comprising:
a body;
at least one White light emitting diode (LED) having a color temperature no greater than 2950K and that is supported by a circuit board that is supported by the body;
a pair of conductors electrically connected to the white light LED and extending beyond the body, the pair of conductors being configured to electrically connect the illumination device to a power system of a vehicle such that the at least one white light LED, an internal color-filtering lens, an external lens and circuit board are sealed within the body such that the white light LED is directed toward the internal color-filtering lens and then onto the external lens that is secured to or integrated with the body and wherein both the internal color-filtering lens and the external lens are formed of AMECA approved materials; and
wherein the external lens is disposed over the color filtered white light LED and wherein light emitted by the white light LED is filtered by the internal color-filtering lens such that light emitted to atmosphere from the illumination device has a different chromaticity than a chromaticity of light emitted by the White light LED and satisfies one of United States Federal Motor Vehicle Safety Standard 108 (FMVSS 108), European Standard regulation UNECE R48, the ABYC A16 standard, and the ISO proposed Performance and Testing of LED Navigation Lights.

31. The illumination device of claim 30 wherein the illumination device forms a navigation light and the at least one white light emitting diode (LED) has a color temperature that is no greater than 2900K and at least one of the external lens and the internal lens is formed of a material listed in one of the AMECA Fall 2005 Final Edition or AMECA October 2014 listings of "Acceptable Plastics for Optical Lenses and Reflex Reflectors Used on Motor Vehicles".

32. The illumination device of claim 31 wherein the material is further defined as one of Bayer PC 2805 Green or Bayer PC 2805 Red AMECA approved polycarbonate materials.

33. A vehicle marker light assembly comprising:
at least one light assembly attached to a vehicle and configured to provide an illuminated indication as to motion of the vehicle, wherein the light assembly further comprises:
at least one white light source consisting of at least one white light light emitting diode (LED) having a color temperature of less than 2950K wherein the at least one white light LED is supported by a circuit board that is supported by a body and the vehicle marker light assembly includes a pair of conductors that are electrically connected to the white light LED and extend beyond the body and are configured to electrically connect the illumination device to a power system of a vehicle;
a lens associated with each of the at least one white light source and formed of a material identified in an AMECA publication of "Acceptable Plastics for Optical Lenses and Reflex Reflectors Used on Motor Vehicles" to generate either of a red light output or an amber light output that satisfies at least one of the U.S.

Department of Transportation Federal Motor Vehicle Safety Standard (FMVSS)108 and European Standard regulation UNECE R48, the ABYC A16 standard, and the ISO proposed Performance and Testing of LED Navigation Lights when the respective at least one white light source is energized and such that the at least one white light LED, the lens, and circuit board are sealed within the body such that the white light LED is directed toward lens that is formed of a material identified in an AMECA publication of "Acceptable Plastics for Qptical Lenses and Reflex Reflectors Used on Motor Vehicles".

* * * * *

UNITED STATES PATENT AND TRADEMARK OFFICE
CERTIFICATE OF CORRECTION

PATENT NO. : 10,118,541 B2
APPLICATION NO. : 14/532719
DATED : November 6, 2018
INVENTOR(S) : Patrick Jeffery Condon and Mark Bryan Pruss It is certified that error appears in the above-identified patent and that said Letters Patent is hereby corrected as shown below:

In the Claims

Claim 1, Column 11, Line 18, Replace "(LEC(s))" with --(LED(s))--

Claim 2, Column 11, Line 49, Replace "claim I" with --claim 1--

Claim 7, Column 12, Line 1, Replace "claim I" with --claim 1--

Claim 21, Column 13, Line 6, Replace "Wherein" with --wherein--

Signed and Sealed this
Nineteenth Day of March, 2019

Andrei Iancu
*Director of the United States Patent and Trademark Office*